US006782007B1

(12) United States Patent
Redman

(10) Patent No.: US 6,782,007 B1
(45) Date of Patent: Aug. 24, 2004

(54) TDM BUS SYNCHRONIZATION CIRCUIT AND PROTOCOL AND METHOD OF OPERATION

(75) Inventor: Mark D. Redman, Chandler, AZ (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/238,003

(22) Filed: Jan. 26, 1999

(51) Int. Cl.[7] .................................................. H04J 3/06
(52) U.S. Cl. ...................................... 370/509; 370/510
(58) Field of Search ................................ 370/389, 412, 370/413, 414, 415, 416, 417, 418, 419, 474, 475, 476, 503, 509, 510

(56) References Cited

U.S. PATENT DOCUMENTS

| | | | | |
|---|---|---|---|---|
| 4,208,650 A | * | 6/1980 | Horn | 714/798 |
| 5,204,882 A | * | 4/1993 | Chao et al. | 375/354 |
| 5,528,590 A | * | 6/1996 | Iidaka et al. | 370/395 |
| 5,619,500 A | * | 4/1997 | Hiekali | 370/414 |
| 6,122,281 A | * | 9/2000 | Donovan et al. | 370/401 |
| 6,473,430 B2 | * | 10/2002 | Sreedharan et al. | 370/395.63 |

* cited by examiner

*Primary Examiner*—Chi Pham
*Assistant Examiner*—Alexander O. Boakye

(57) ABSTRACT

There is disclosed a data transfer system that uses a TDM serial multiple format and supporting method that is capable of multiplexing and de-multiplexing a number of asynchronous and arbitrarily framed component serial data streams. The data transfer system comprises: 1) a frame data interface circuit capable of receiving incoming data streams from a plurality of asynchronous frame data sources and indicating their frame boundaries with the bit streams; and 2) a transmit buffer and data segmenter coupled to the frame data interface circuit and receiving the incoming data frames therefrom. The transmit buffer/segmenter divides incoming data frames into N-bit data fields and attaches to each N-bit data field an M-bit control field identifying the frame bit boundary and capable of conveying additional control or synchronization information associated with the incoming data frames. Each N-bit data field and the attached M-bit control field comprise a data record to be transmitted. The data records are assembled into a TDM transport formatted datagram consisting of, for example, 28 time slots, each of which is capable of carrying a single data record from a selected serial buffer/segmenter. The data transfer system further comprises a receive buffer coupled to the transmit buffer. The receive buffer reassembles the incoming data frames from the received data records and generates from the synchronization indicia a timing signal associated with the incoming data frames. A receive clock generator uses the receive buffer timing signal to regenerate the individual clock signal associated with each asynchronous serial stream component.

20 Claims, 5 Drawing Sheets

TDM BUS SYNCHRONIZATION CIRCUIT AND PROTOCOL AND METHOD OF OPERATION

TECHNICAL FIELD OF THE INVENTION

The present invention is directed, in general, to data bus architectures and, more specifically; to a circuit and protocol for synchronizing data transfers on a TDM bus architecture.

CROSS-REFERENCE TO RELATED APPLICATIONS

The present invention is related to that disclosed in U.S. patent application Ser. No. 09/164,925, entitled "COMMUNICATION BUS ARCHITECTURE FOR INTERCONNECTING DATA DEVICES USING SPACE AND TIME DIVISION MULTIPLEXING AND METHOD OF OPERATION" and filed on Oct. 1.1998. U.S. patent application Ser. No. 09/164,925 is commonly assigned with the present invention and is incorporated herein by reference for all purposes.

BACKGROUND OF THE INVENTION

Information systems have evolved from centralized mainframe computer systems supporting a large number of users to distributed computer systems based on local area network (LAN) architectures. As the cost-to-processing-power ratios for desktop PCs and network servers have dropped precipitously, LAN systems have proved to be highly cost effective. As a result, the number of LANs and LAN-based applications has greatly increased.

A consequential development relating to the increased popularity of LANs has been the interconnection of remote LANs, computers, and other equipment into wide area networks (WANs) in order to make more resources available to users. This allows LANs to be used not only to transfer data files among processing nodes in, for example, an enterprise (i.e., privately owned) network, but it also allows LANs to be used to transfer voice and/or video signals in, for example, the public telephone networks. However, a LAN backbone can transmit data between users at high bandwidth rates for only relatively short distances. In order to interconnect devices across large distances, different communication protocols have been developed. These include X.25, ISDN, frame relay, and ATM, among others.

Most data transmissions, including file transfers and voice, occur in bursts at random intervals. The bursty nature of most data transmissions means that if the bandwidth allocated to a transmitting device is determined according to its peak demand, much bandwidth is wasted during the "silences" between data bursts. This variable bandwidth demand problem has been solved in part by X.25, frame relay and ATM, which use statistical multiplexing to improve the throughput of multiple users.

In order to allow dissimilar protocol devices, such as frame relay systems and ATM systems, and different speed data lines, such as T1 and T3, to communicate with one another, a host of well-known interfaces have been developed to interconnect the dissimilar devices. For example, frame relay-to-ATM interfaces have been developed that include a high-level data link control (HDLC) interface for sending and receiving frames to and from a frame relay-based network and a segmentation and reassembly (SAR) interface for sending and receiving cells to and from an ATM-based network.

It is therefore common to find networks containing a mixture of interconnected, diverse protocol devices, such as frame relay devices and ATM devices, communicating with one another via a high-speed backbone network. To access this high-speed backbone network, it is common practice to employ multiplexers at or near the periphery of a network to receive lower speed data transfers from a group of devices and/or sub-networks. To increase the effective throughput of this access (i.e., the utilization of the backbone network) access concentrators commonly replace these access multiplexers. Besides access multiplexing, access concentrators use semiconductor memory to permit the peak access bandwidth (i.e., the peak aggregate bandwidth of the access ports) to actually exceed the peak available bandwidth of the backbone circuit. This is done under the assumption that, under ordinary circumstances, not all of the input lines transmit simultaneously and, when the input lines do transmit simultaneously, it is for a short period of time (i.e., statistical multiplexing).

A communication network that includes data transport links that are operating at nominally the same primitive frequency, but still asynchronously (i.e., almost synchronous), is referred to as a plesiochronous network. A digital network which uses a strict or fixed set of frequencies to multiplex a fixed primitive frequency is referred to as a digital hierarchy. A digital hierarchy of plesiochronous primitives is referred to as a plesiochronous digital hierarchy (PDH). A PDH network typically includes a discrete number of fixed data rates in which the rates of all data lines are a multiple of a base rate. For example, in North America, a T1 line carries twenty-four (24) of the basic (DS0) rate channels of 64 Kbps and a T3 line carries a DS3 rate channel of 28 (T1) or 672 (DS0). Multiple T1, lines can therefore be multiplexed into a T3 line, with each of the T1 lines operating at different clock speeds. PDH networks typically use a highly accurate clock, such as a cesium clock, as a master clock to overcome problems inherent in multiplexing data lines from multiple sources within a network having different primitive data rates.

Many concentrators and other communications devices, such as multiplexers, switches, routers, bridges, etc., contain interconnection circuitry designed to direct input signals received by a group of input port devices to a group of output devices, such as protocol processors. Frequently, the internal interconnection circuitry takes the form of a multiplexer that receives signals from a variable number of interface lines (i.e., multi-source) and directs the composite aggregate signal over a single wire to one or more destinations.

Additionally, the serial data transferred on a bus line typically is buffered in the receiving interface before further processing takes place. The size of the receiving data buffer is usually determined by the size of the incoming frames. For example, in a T1 interface, the receiving buffers are frequently sized to store an entire or even multiple sequential instances of the 193-bit frame received from the interconnection bus architecture. This is true even if the protocol processing engines that process the data stored in the receiving buffers are only 32-bit processors. The larger the receiving data buffers are, the larger and more complex are the line interface cards.

There is therefore a need in the art for improved TDM serial communications and synchronization techniques for use in a plesiochronous communications device that performs high-speed data multiplexing and de-multiplexing of asynchronous framed data streams. In particular, there is a need for a synchronization circuit and a synchronization protocol that minimizes the complexity involved in synchronizing data transfers in a plesiochronous digital hierarchy. More particularly, there is a need for a synchronization circuit and a synchronization protocol that minimize or eliminate the number of clock lines needed in a bus architecture that interconnects a plurality of data drivers and a plurality of data receivers. Finally, there is a need for a synchronization circuit and a synchronization protocol that minimize the memory requirements of the interface circuitry that transfers the data across a serial TDM medium.

SUMMARY OF THE INVENTION

To address the above-discussed deficiencies of the prior art, it is a primary object of the present invention to provide, for use in a communication device, a data transfer system comprising: 1) a frame data interface circuit capable of receiving incoming data frames from a plurality of frame data sources; and 2) a transmit buffer coupled to the frame data interface circuit and receiving the incoming data frames therefrom, wherein the transmit buffer is capable of dividing a first selected incoming data frames into a plurality of N-bit data fields and attaching to each of the plurality of N-bit data fields a M-bit control field comprising a synchronization indicia associated with the first selected incoming data frame, each N-bit data field and the attached M-bit control field comprising a data record. The data transfer system further comprises a receive buffer coupled to the transmit buffer and receiving the data records therefrom, wherein the receive buffer is capable of re-assembling the first selected incoming data frame from selected ones of the received data records and generating from the synchronization indicia therein a timing signal associated with the first selected incoming data frame.

According to another embodiment of the present invention, the first selected incoming data frame comprises a T1 frame received from a T1 line coupled to the frame data interface circuit.

According to another embodiment of the present invention, the synchronization indicia comprises a frame marker indicating a boundary of the T1 frame.

According to still another embodiment of the present invention, a first M-bit control field in a first selected data record indicates where in a first N-bit data record in the first selected data record the frame marker is located.

According to yet another embodiment of the present invention, the synchronization indicia comprises a synchronous residual time stamp.

According to a further embodiment of the present invention, the first selected incoming data frame comprises a T3 frame received from a T3 line coupled to the frame data interface circuit.

According to a still further embodiment of the present invention, at least one of the incoming data frames received by the frame data interface circuit is received at a first bit data rate and at least one of the incoming data frames received by the frame data interface circuit is received at a second bit data rate different than the first bit data rate.

According to a yet further embodiment of the present invention, the incoming data frames received by the frame data interface circuit comprise T1 frames and T3 frames The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data communications device.

The following descriptions of the present invention discuss numerous telecommunications systems and circuits, such as access concentrators, T1 lines, T3 lines, and the like, and numerous telecommunications protocols, such as ATM, frame relay, time division multiplexing (TDM), and the like, that are well-known in the art. Additional details regarding these telecommunications protocols, systems and circuits are contained in "NEWTON'S TELECOM DICTIONARY," $14^{TH}$ edition, Flatiron Publishing, 1998. NEWTON'S TELECOM DICTIONARY is hereby incorporated by reference into the present disclosure as if fully set forth herein.

Figure 1:
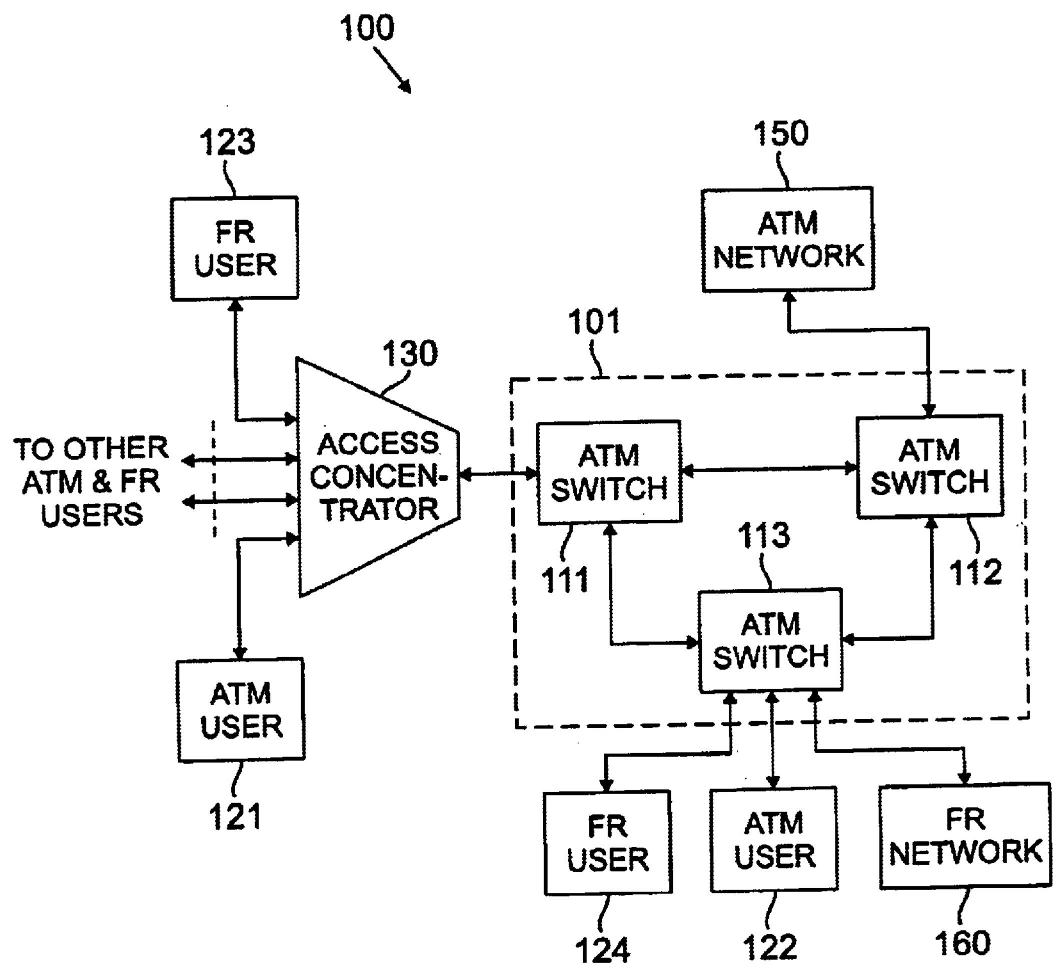
FIG. 1 illustrates an exemplary network infrastructure that interconnects a plurality of end users in accordance with one embodiment of the present invention.

FIG. 1 illustrates an exemplary network infrastructure 100 that interconnects a plurality of end users, including, for example frame relay end users and ATM end users, in accordance with one embodiment of the present invention. Network infrastructure 100 comprises an ATM backbone network 101 that provides switching connectivity between a plurality of devices, including ATM users 121 and 122, frame relay users 123 and 124, an external ATM network 150, and an external frame relay network 160. ATM users 121 and 122 each may comprise any device capable of sending and/or receiving ATM cells. Likewise, frame relay users 123 and 124 each may comprise any device capable of sending and/or receiving frame relay data frames.

In order to maximize use of the high capacity of ATM backbone network 101, access concentrator 130 is used to receive frame relay frames and ATM cells from a plurality of sources, including frame relay user 123 and ATM user 121. Access concentrator (AC) 130 comprises, among other things, frame relay-to-ATM interface circuitry that converts the received frame relay frames to ATM cells. These converted ATM cells and the ATM cells received from ATM devices are then multiplexed together, so that the output of access concentrator 130 comprises a comparatively high volume of tightly packed ATM cells. Thus, AC 130 ensures a high volume of ATM traffic is transmitted into ATM backbone network 101.

The communication lines connecting AC 130 to the frame relay users and ATM users, including frame relay (FR) user 123 and ATM user 120, typically comprise T1 and T3 lines. As is well known, a T1 line is a digital transmission line with a capacity of up to 1.544 Mbps. The T1 circuit carries 24 voice signals, each one transmitting at 64 Kbps. An analog voice signal is sampled at a rate of 8000 times per second using pulse code modulation (PCM). Each sample comprises an 8 bit word, thereby creating an 8×8000=64 Kbps DS0 (digital service, level 0) building block. The 24 voice signals carried on the T1 are combined into a single bit stream by means of time division multiplexing (TDM). The TDM technique generates T1 frames comprising one sample (8 bits) from each of the 24 voice signals (or channels) plus one synchronization bit, referred to as a "framing bit". Thus, a T1 frame comprises (8×24)+1=193 bits. The T1 frames are generated at the sampling rate (8000 per second), thereby determining the T1 transmission rate 193×8000=1.544 Mbps. T3 lines are also well known. A T3 line carries 28 T1 lines plus some overhead data bits at a rate of 44.736 Mbps (typically, referred to as "45 Mbps").

Within access concentrator 130, the bits streams on the T1 and T3 input lines are "compacted" onto a lesser number of higher speed data lines, thereby maximizing use of the available ATM bandwidth on the output of AC 130. Thus, serial input data streams are received at different rates and in data bursts separated by time gaps in which no data are being transmitted, and are transmitted out of AC 130 at a single, higher speed bit stream containing fewer time gaps.

Figure 2:
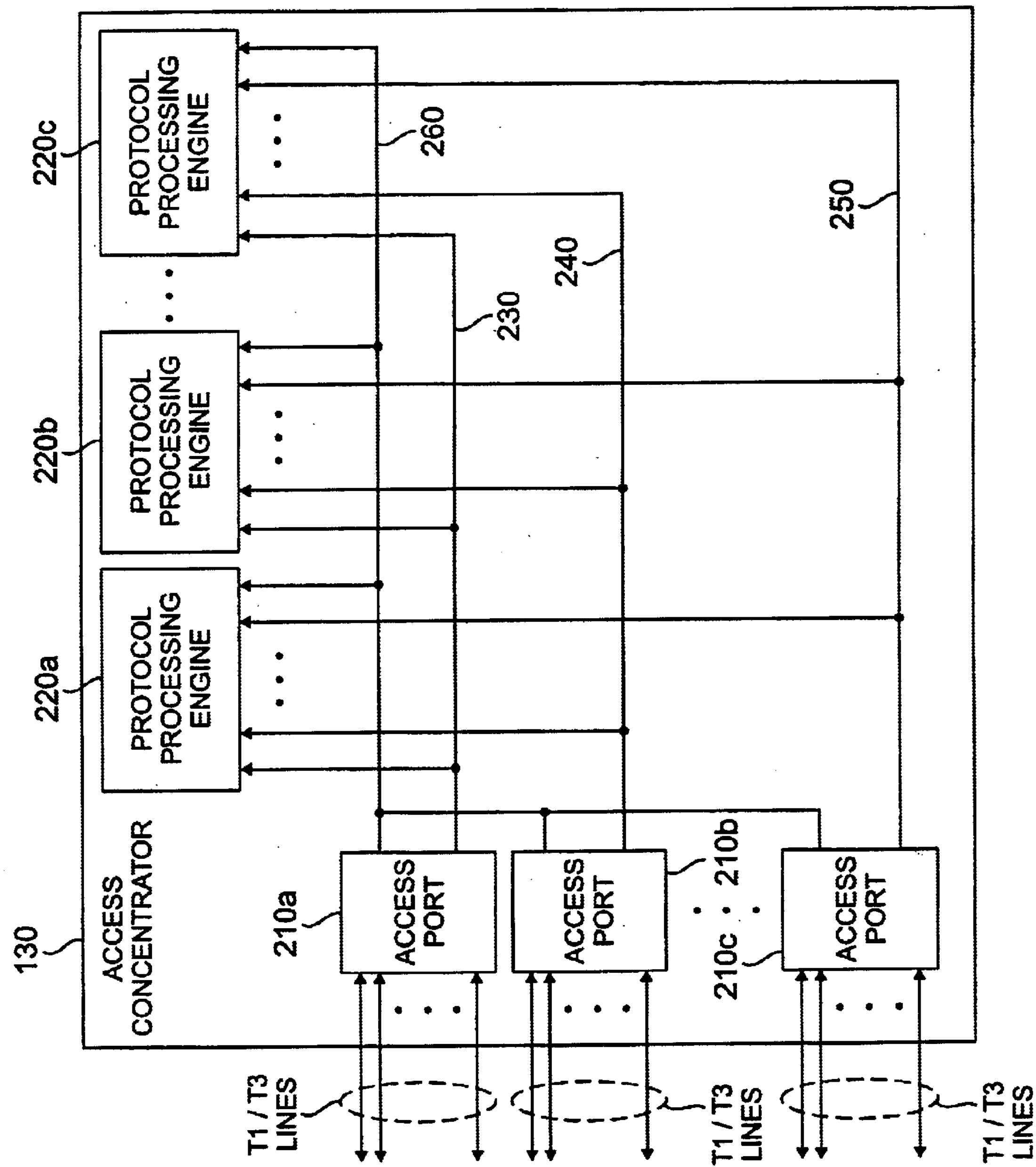
FIG. 2 illustrates an exemplary bus infrastructure within the exemplary access concentrator shown in FIG. 1 for interconnecting a plurality of data drivers with a plurality of data receivers in accordance with one embodiment of the present invention.

FIG. 2 illustrates an exemplary bus infrastructure 200 within exemplary access concentrator (AC) 130 for interconnecting a plurality of data drivers with a plurality of data receivers in accordance with one embodiment of the present invention. AC 130 comprises exemplary access ports 210*a*, 210*b*, and 210*c*, among others, and protocol processing engines (PPE) 220*a*, 220*b*, and 220*c*. Access ports 210*a–c* read serial input data streams from the input T1 and/or T3 lines, buffer the input data, and then transmit it at a higher rate to selected ones of PPE 220*a–c*. The data streams generated by access ports 210*a–c* contain appropriate addressing information to direct the data stream to the correct one of PPE 220*a–c*. PPE 220*a–c* convert the data received from access ports 210*a–c* from its original protocol format, such as frame relay, to the ATM protocol used in ATM backbone network 101. After protocol conversion is complete, PPE 220*a–c* relay the converted data to other processing modules (not shown) in access concentrator 130. AC 130 eventually sends the converted data to ATM backbone network 101. AC 130 also receives ATM data from ATM backbone network 101 and processes the received ATM data in the reverse direction using PPE 220*a–c*.

The bus architecture interconnecting access ports 210*a–c* and protocol processing engines 220*a–c* comprises a plurality of single source-multidrop T3 lines carrying serial streams of time division multiplexed (TDM) data. For example, bus line 230 is coupled to only one source, the primary data output of access port 210*a*, and to a plurality of destinations (or drops) on the inputs of some or all of the protocol processing engines in access concentrator 130. Similarly, bus line 240 is coupled to only one source, the primary data output of access port 210*b*, and to multiple destinations, namely, some or preferably all of the inputs of PPE 220*a–c*. Finally, bus line 250 is coupled to only one source, the primary data output of access port 210*c*, and to multiple destinations on the inputs of PPE 220*a–c*.

The above-described bus architecture provides a minimized sensitivity to single point faults by using single, spatially separated drivers (i.e., access ports 210*a–c*) and multidrop receivers (PPE 220*a–c*). This may be described as a single source/multidrop architecture. Therefore, if a T3 bus line becomes stuck at a Logic 1 level or a Logic 0 level, the affected access port 210 and the corresponding T3 bus line will not prevent the remaining access ports and T3 bus lines from transmitting TDM data streams to the protocol processing engines. In this manner, the bus architecture provides both space and time division multiplexing (STDM) of serial data streams.

The bus architecture is made even more robust by means of "backup" bus line 26.0 that is coupled in a M:N configuration (i.e., multisource/multidrop) between access ports 210*a–c* and PPE 220*a–c*. Bus line 260 is coupled to the secondary data outputs of all drivers (i.e., access ports 210*a–c*) and to secondary data inputs on all receivers (i.e., PPE 220*a–c*). In the event of a failure of one of the primary 1:N bus lines, such as bus lines 230, 240 or 250, the access port coupled to the failed bus line switches over to backup bus line 260 in order to continue transmitting TDM data streams to the receivers.

Although backup bus line 260 is coupled to the stubs of all drivers and may therefore suffer from higher bit error rates caused by reflections, this is an acceptable tradeoff for the additional robustness provided by backup bus line 260. Backup bus line 260 is used only after a failure of one of the primary bus lines 230, 240 or 260, and is needed only until the faulty line driver card can be replaced. In a preferred embodiment of the present invention, the drivers, access ports 210*a–c*, may modify the transmission rate of the TDM data streams sent over backup bus line 260 in order to minimize reflections and errors during transmission.

The bus architecture illustrated in FIG. 2 and described above is used to connect outputs of access ports 210*a–c* with inputs on PPE 220*a–c*. However, access ports 210*a–c* and PPE 220*a–c* are bi-directional devices. As stated above, ATM data is received from ATM backbone network 101, processed in PPE 220*a–c* to convert the ATM data back to the suitable protocol, and then transmitted to access ports 210*a–c*. The transfers of data from the outputs of PPE 220*a–c* to inputs on access ports 210*a–c* is performed by means of a "reverse direction" bus architecture similar to the one depicted in FIG. 2 and described above. That is, one output on each of PPE 220*a–c* is connected by means of a T3 bus line in a 1:N (single source/multidrop) configuration to an input on every one of the access ports 210*a–c*. In one embodiment of the invention, the 1:N bus lines on each output of PPE 220*a–c* are actually dual serial T3 lines, thereby providing twice DS3 capacity. This is done because the output bit rates of the protocol processing engines 220*a–c* are frequently higher than the output bit rates of the access ports 210*a–c*. Therefore, the reverse direction bus architecture uses dual serial T3 lines.

The reverse direction bus architecture is not shown in FIG. 2 for the purposes of simplicity and clarity in describing the "forward direction" bus architecture shown in FIG. 2 and because the depiction and detailed description of the reverse direction bus architecture would be redundant and unnecessary.

As stated above, access concentrator 130 receives data from external users and from ATM backbone network 101 in different formats, including frame relay and ATM formats. To maintain the integrity of the data and its timing as it is transferred between any one of access ports 210*a–c* and a corresponding destination at PPE 220*a–c*, the present invention provides a unique protocol for communicating a number of asynchronous serial data streams over a single serial data line and recovering the timing of the original sources at the destination from the conveyed framing information and a priori knowledge of the frame rate. The present invention re-formats incoming data into separated 32-bit data fields, each of which is augmented by a 6-bit control field. The 6-bit control field is used by access concentrator 130 to perform the transfer of certain protocol signals, such as frame pulses, null time-slot indicators, synchronous residual time stamps (SRTS) indicators, and the like, from access ports 210*a–c* to PPE 220*a–c*.

Figure 3:
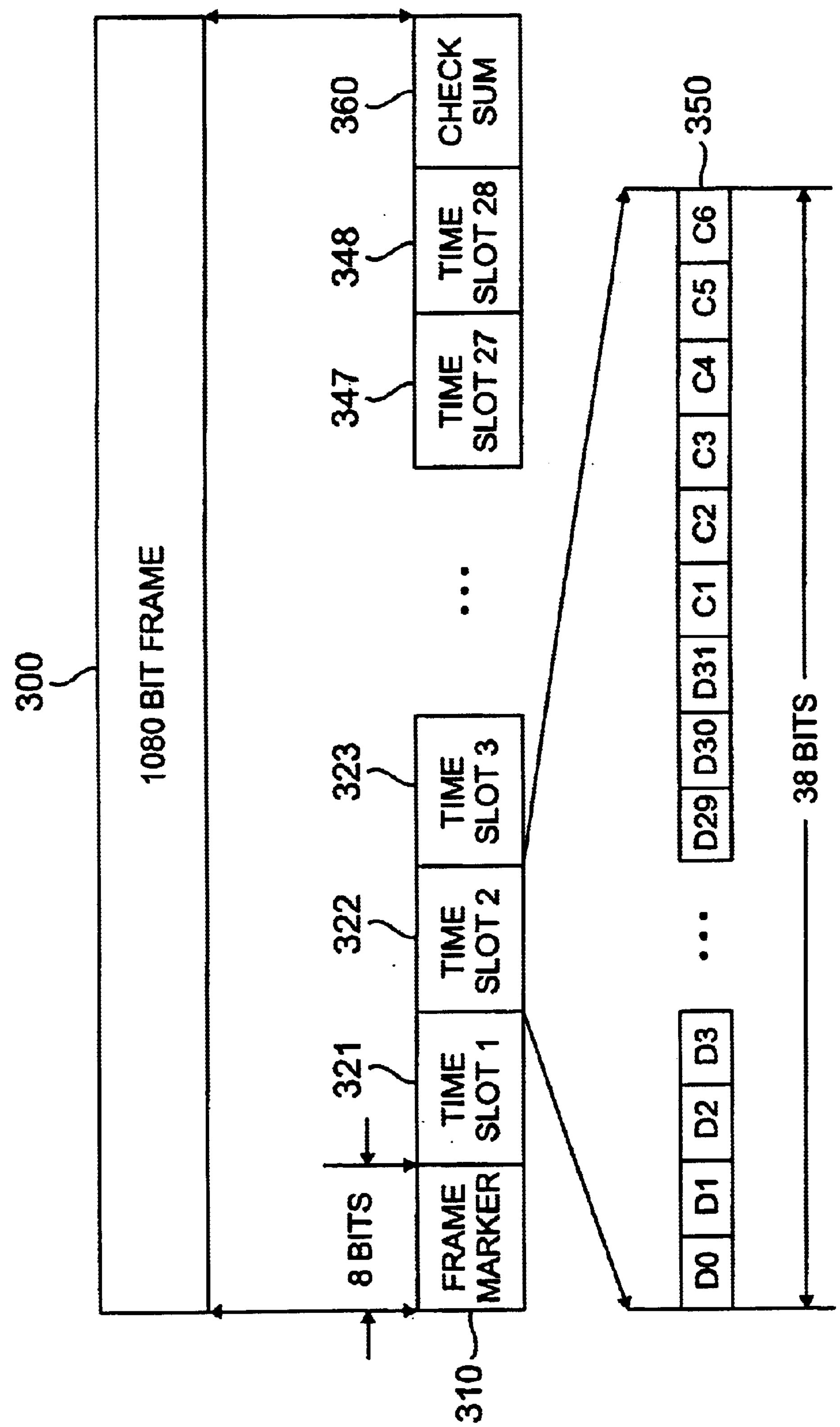
FIG. 3 illustrates an exemplary TDM frame for transferring data between an access port and a protocol conversion engine within the access concentrator in FIG. 2 in accordance with one embodiment of the present invention.

FIG. 3 illustrates exemplary TDM frame 300 for transferring data between exemplary access port 210 and exemplary protocol conversion engine 220 within access concentrator 130 in accordance with one embodiment of the present invention. Data are transmitted in a 1080-bit time division multiplex (TDM) frame 300 comprising 8-bit frame marker 310, twenty-eight (28) time slots 321–348, and an 8-bit check sum 360. Each of time slots 321–348, arbitrarily labeled Time Slot 1 through Time Slot 28, contains a 38-bit data record. The 38-bit data record comprises a 32-bit data field, consisting of data bits D0–D31, and a 6-bit control field, consisting of control bits C1–C6.

Data received by access concentrator 130 from a plurality of external T1 and/or T3 lines or from ATM backbone network 101 are broken into smaller 32-bit data fields in exemplary access port 210 and exemplary PPE 220 and a 6-bit control field is attached to each record. As noted above, the control codes are used to indicate, among other things, the locations of frame boundaries, multi-frame boundaries, SRTS indicators, and the like.

A 6-bit control code can have sixty-four (64) possible binary values. In one embodiment of the present invention, the 6-bit control codes are defined in accordance with Table 1 below:

TABLE 1

| Decimal Code | Binary Value | Meaning |
|---|---|---|
| 0 | 000000 | SDCi = 0, non-empty record, no frame pulse |
| 1 thru 32 | 000001 thru 100000 | Bit location in data record of frame or multi-frame marker |
| 33 | 100001 | Empty data record |
| 34 thru 62 | 100010 thru 111110 | Not used |
| 63 | 111111 | SDCi = 1, non-empty record, no frame pulse |

A multi-frame boundary may be indicted by sending consecutive frame markers in consecutive data records. The serial data channel (SDC) values in the table above are used for SRTS signal/value communications.

The 38-bit data record used in the disclosed protocol provides an effective tradeoff between the competing concerns of bandwidth and minimal data storage requirements. In alternate embodiments of the present invention, the sizes for the data field and the control field may be modified. For example, a 12-bit, 28-bit, 124-bit or 252-bit data field may be implemented, and a 4-bit, 5-bit, 7-bit or 8-bit control field may also be used (i.e., using the previous code embodiment for illustrative purposes constrains an N-bit code to a max data field width of ($2^N$–4) bits). Increasing the data field to 124 bits or 252 bits while using a 6-bit or 7-bit control field would increase bandwidth efficiency, but at the expense of greater memory requirements and increased latency. Decreasing the data field to 12 bits, 20 bits, 24 bits, etc., while using a 4-bit or 5-bit control field minimizes memory requirements and decreases latency, but does so at the expense of decreased bandwidth efficiency.

Figure 4:
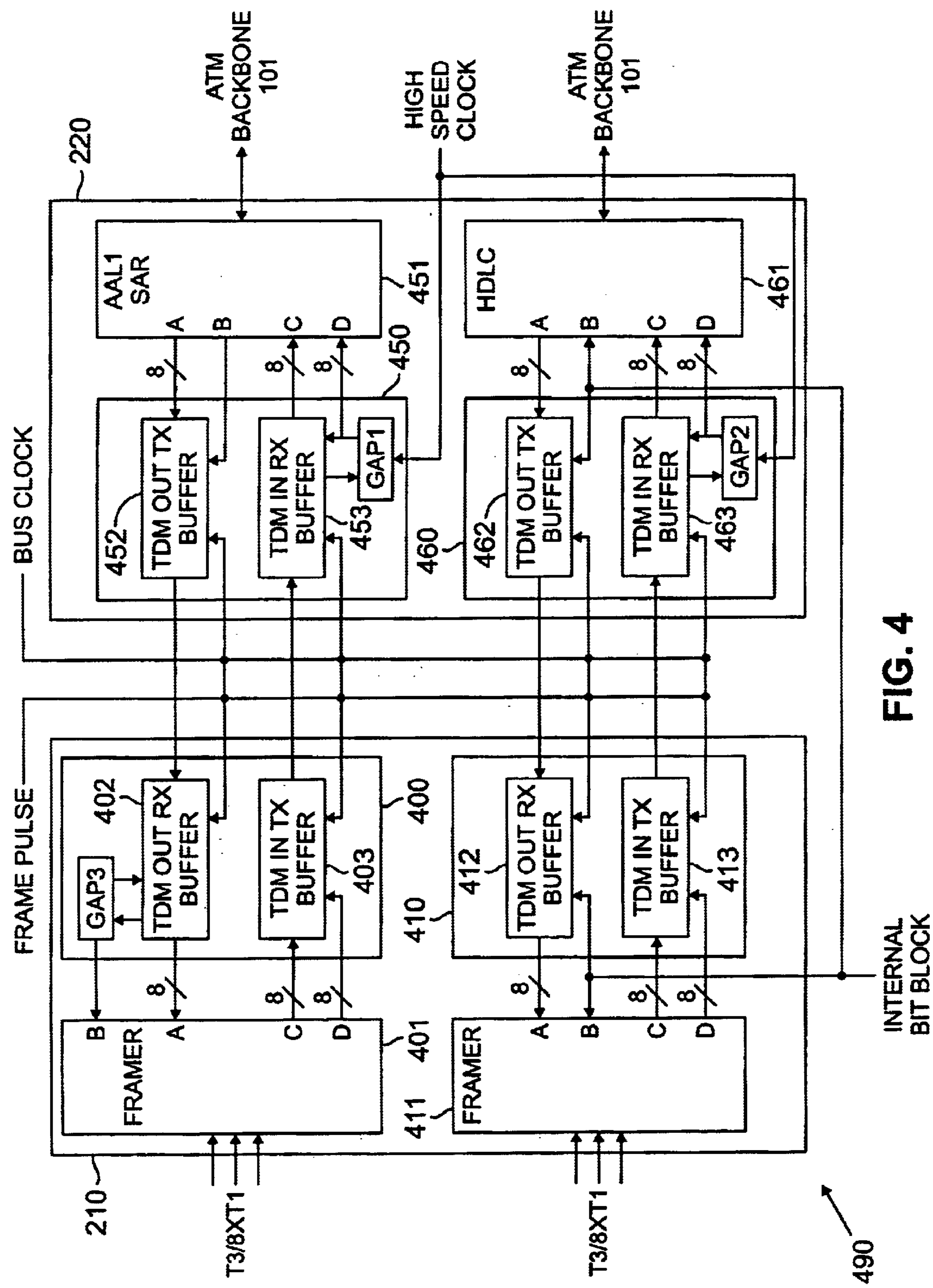
FIG. 4 illustrates an exemplary data synchronization and clock recovery interface in accordance with one embodiment of the present invention.

FIG. 4 illustrates exemplary data synchronization and clock recovery interface 490 in accordance with one embodiment of the present invention. Interface 490 is used to transfer TDM frames similar to TDM frame 300 across selected bus lines such as those between access port 210 and PPE 220. Interface 490 comprises access port TDM interfaces (TIFs) 400 and 410, framers 401 and 411, PPE TDM interfaces (TIFs) 450 and 460, ATM adaptation layer 1 segmentation and reassembly (AAL1 SAR) controller 451, and high-level data link control (HDLC) controller 461. Access port TIF 400 further comprises TDM OUT receive (RX) buffer 402, TDM IN transmit (TX) buffer 403, and gapped clock processor, referred to as "GAP3 clock." Access port TIF 410 further comprises TDM OUT RX buffer 412 and TDM IN TX buffer 413. PPE TIF 450 further comprises TDM OUT TX buffer 452, TDM IN RX buffer 453, and GAP1 clock. Finally, PPE TIF 460 further comprises TDM OUT TX buffer 462, TDM IN RX buffer 463, and GAP2 clock.

The term "IN" in the names of buffers in access port 210 and PPE 220 is a convention used to identify data paths carrying data from external devices into ATM backbone network 101 through concentrator 130. Thus, one half of framer 411, TDM IN TX buffer 413, TDM IN RX buffer 463, and one half of HDLC controller 461 form an "IN" data path. Likewise, one half of framer 401, TDM IN TX buffer 403, TDM IN RX buffer 453, and one half of AAL1 SAR controller 451 also form an "IN" data path.

The term "OUT" in the names of buffers in access port 210 and PPE 220 is a convention used to identify data paths carrying data from ATM backbone network 101 out to external devices through concentrator 130. Thus, one half of framer 411, TDM OUT RX buffer 412, TDM OUT TX buffer 462, and one half of HDLC controller 461 form an "OUT" data path. Likewise, one half of framer 401, TDM OUT RX buffer 402, TDM OUT TX buffer 452, and one half of AAL1 SAR controller 451 also form an "OUT" data path.

Framer 411 receives framed data from a plurality of frame relay incoming lines, such as, for example, a T3 line or eight (8) T1 lines. In the case of eight T1 lines, framer 411 detects the 192-bit frame data and the frame pulse/bit from each T1 line. Framer 411 has multiple outputs, shown collectively as output C. The recovered frame data and the frame pulses are sent to TDM IN TX buffer 413 in access port TIF 410 from output C of framer 411 and each of the nominal 1.544 Mbps T1 clocks (8 clocks in the case of 8 T1 lines) is output from output D of framer 411. In the case of a T3 line, output C of framer 411 sends the single T3 data to TDM IN TX buffer 413 in access port TIF 410 and the single 45 Mbps T3 clock is output from output D of framer 411.

Access port TIF 410 stores the T1 and T3 frame data (including the frame pulse/bit) received from framer 411 in TDM IN TX buffer 413 in 32-bit data fields. Access port TIF 410 also attaches a 6-bit control field to each 32-bit data field in accordance with the protocol definitions set forth in Table 1 above. The 38-bit data records are grouped into 1080-bit TDM frames 300 (shown in FIG. 3). The 1080-bit TDM frames are transferred from TDM IN TX buffer 413 to TDM IN RX buffer 463 in PPE TIF 460 on one of the bus lines 230, 240, 250, or 260 (shown in FIG. 2). The signal BUS CLOCK drives TDM IN TX buffer 413 and TDM IN RX buffer 463 at a 60 Mbps rate. Additionally, the signal FRAME PULSE is applied to TDM IN TX buffer 413 and TDM IN RX buffer 463 to mark the end (or start) of each 1080-bit TDM frame 300.

TDM IN RX buffer 463 may reform each of the 32-bit data fields back into, for example, T1 frames for eight (8) T1 lines or may reform all of the 32-bit data fields into a single T3 frames. The T1/T3 frames are then sent to Input C of HDLC 461, which converts the T1 data frames or T3 data frames into ATM cells that are sent to ATM backbone network 101. The frame data are drained from TDM IN RX buffer 463 by means of HIGH SPEED CLOCK signal applied to GAP 2 clock. This clock would by itself slightly over-sample the data in TDM IN RX buffer 463 using a clock rate that is slightly higher than the T1 or T3 clock received by framer 411. For example, if framer 411 receives T1 lines at 1.544 MHz, rate, High Speed Clock signal may have a value of 1.55 MHz.

As the High Speed Clock signal drains the TDM IN RX buffer 463 faster than it is filled by framer 411 and TDM IN TX buffer 413, a digital phase lock loop (PLL) in TDM IN RX buffer 463 monitors the "fill" state of the buffer associated with each channel to determine whether the channel data is being clocked out faster or slower than the rate at which it is arriving over the bus. That is, the channel fill state becomes the phase error signal of the digital phase locked loop (DPLL). It-then sends a gate pulse signal to GAP 2 clock that "gaps" the GAP 2 clock signals that are applied to TDM IN RX buffer 463 and Input D of HDLC 461 to effectively throttle the High Speed clock down to the required value for that channel. By inserting a periodic gap (tied to the channel fill state of the buffer) in each of the GAP 2 clock signals (8 clocks in the case of 8 T1 lines), the multiple T1 line data frames are then individually transferred into HDLC 461 at exactly the same 1.544 MHz rate at which the individual T1 data frames are produced by framer 411.

In the reverse direction, HDLC 461 receives data from ATM backbone 101 and sends it to TDM OUT TX buffer 462 in PPE TIF 460 on a plurality of outputs, collectively represented as output A on HDLC 461. Output A may comprise, for example, the equivalent of 8 T1 line data streams, or the equivalent of a T3 line data stream, depending on the output lines connected to framer 411. In the case of T1 lines, input B of HDLC 461 and TDM OUT TX buffer 462 receive a highly accurate 1.544 MHz network clock signal, labeled INTERNAL BIT CLOCK, that is used to clock the T1 data into the registers in TDM OUT TX buffer 462.

The T1 data are reformatted in TDM OUT TX buffer 462 into two parallel streams of 1080-bit TDM frames 300, as shown in FIG. 3. Since PPE 220 can output data at a higher data to access port 210, two parallel streams of 1080-bit TDM frames are transmitted from TDM OUT TX buffer 462 to TDM OUT RX buffer 412 in the reverse direction bus architecture. Thus, the reverse direction bus architecture described above in FIG. 2 can support the equivalent of two DS3 signals. TDM OUT RX buffer 412 and framer 411 receive the 1.544 MHz INTERNAL BIT CLOCK signal and use it to transfer, for example, 8 T1 line data streams into framer 411. Framer 411 then sends the data back to the external frame relay user.

Framer 401, TDM IN TX buffer 403, TDM IN RX buffer 453, and AAL1 SAR 451 transfer data in an "inbound" direction from, for example, eight T1 lines or a T3 line, to ATM backbone network 101. Framer 401, TDM IN TX buffer 403, TDM IN RX buffer 453, and AAL1 SAR 451 operate in a manner similar to the operations described above with respect to framer 411, TDM IN TX buffer 413, TDM IN RX buffer 463, and HDLC 461.

However, framer 401, TDM IN TX buffer 403, TDM IN RX buffer 453, and AAL1 SAR 451 operate in an ATM circuit emulation (CE) mode in which the INTERNAL BIT CLOCK is not used to output data from the ATM network into the TDM network. Instead, a frequency-locked output replica of the original data source clock is generated using information derived from the source. This permits the data source/destination clock to be independent of the INTERNAL BIT CLOCK. To describe the processing required for this, it is necessary to consider the complete data path from ingress to the ATM network to egress.

The process begins with TDM IN TX buffer 403 in access port TIF 400. The SRTS code generation processing derives the information/codes needed within the network to regenerate the original source clock. Essentially this involves measuring the instantaneous difference in frequency between the source clock and the local network reference clock and generating "codes" which convey this difference. This is done in TDM IN TX buffer 403 on the access port 210 side of the forward direction bus architecture and the resulting control codes are transmitted with the T1 line (or T3 line) data over the bus architecture to the PPE 220 side.

Data streams from the eight (8) T1 lines (or a T3 line) are transferred out of framer 401 on output C. The T1/T3 data are broken down into 32-bit data fields and a 6-bit control field is attached by TDM IN TX buffer 403. Some of these 6-bit control fields (i.e., from the selected coding, the non-empty, non-frame carrying code words) also contain SDCi bits, as shown in Table 1, that carry the SRTS signal information. The 38-bit data records are transferred out from TDM IN TX buffer 403 to TDM IN RX buffer 453 at 60 Mbps using the BUS CLOCK signal and the FRAME PULSE signal.

The data records stored in TDM IN RX buffer 453 are drained by, for example, 8 GAP1 clocks, which are driven by the HIGH SPEED CLOCK signal. Since the HIGH SPEED CLOCK signal slightly over samples the data records in TDM IN RX buffer 453, TDM IN RX buffer 453 sends a gate pulse signal to GAP1 clock to periodically gap the incoming clock signals, thereby reducing the effective GAP1 clock rate to the exact 1.544 Mbps rate of the incoming T1 lines. The T1/T3 data are received on input C of AAL1 SAR 451, which transfers the T1/T3 data to ATM backbone 101. AAL1 SAR 451 uses the SRTS information to form the AAL1 ATM headers of ATM cells and transmits the ATM cells to ATM backbone network 101.

In the "outbound" direction, AAL1 SAR 451, TDM OUT TX buffer 452, TDM OUT RX buffer 402, and framer 401 transfer data from ATM backbone network 101 to T1 lines and/or T3 lines coupled to external ATM user devices. AAL1 SAR 451, TDM OUT TX buffer 452, TDM OUT RX buffer 402, and framer 401 operate in a manner similar to the operations described above with respect to framer 411, TDM OUT TX buffer 412, TDM OUT RX buffer 462, and HDLC 461, except that the INTERNAL BIT CLOCK signal is not-used to output data. Rather, AAL1 SAR 451, TDM OUT TX buffer 452, TDM OUT RX buffer 402, and framer 401 operate in an ATM circuit emulation (CE) mode in which a "recovered" source clock signal is derived from synchronous residual time stamp (SRTS) signals that are received from end-user source devices via ATM backbone network 101 or from external end-user devices, such as ATM user 121.

In the outbound direction, the source clock signal may be recovered from the SRTS information on either the PPE TIF 450 side of the reverse direction bus architecture or on the access port TIF 400 side. In one scenario, TDM OUT TX buffer 452 may extract the SRTS information received from AAL1 SAR 451 and transmit it to TDM OUT RX buffer 402 as part of the 1080-bit TDM frame information. Within TDM OUT RX buffer 402, the received SRTS information is then used by a network reference clock and a digital or analog phase local loop (PLL) to regenerate the original customer source clock.

Alternatively, AAL1 SAR 451 may recover the SRTS information from the user ATM cells and output the recovered user clock signal on output B of AAL1 SAR 451. TDM OUT TX buffer 452 then transmits only the ATM traffic to TDM OUT RX buffer 402. TDM OUT RX buffer 402 may then use a GAP3 clock to regenerate the original data stream timing as illustrated in FIG. 4. The GAP3 clock may also be passed through a jitter attenuator to regenerate a "smoother" (i.e., less jittered) version of the original user source clock.

Figure 5:
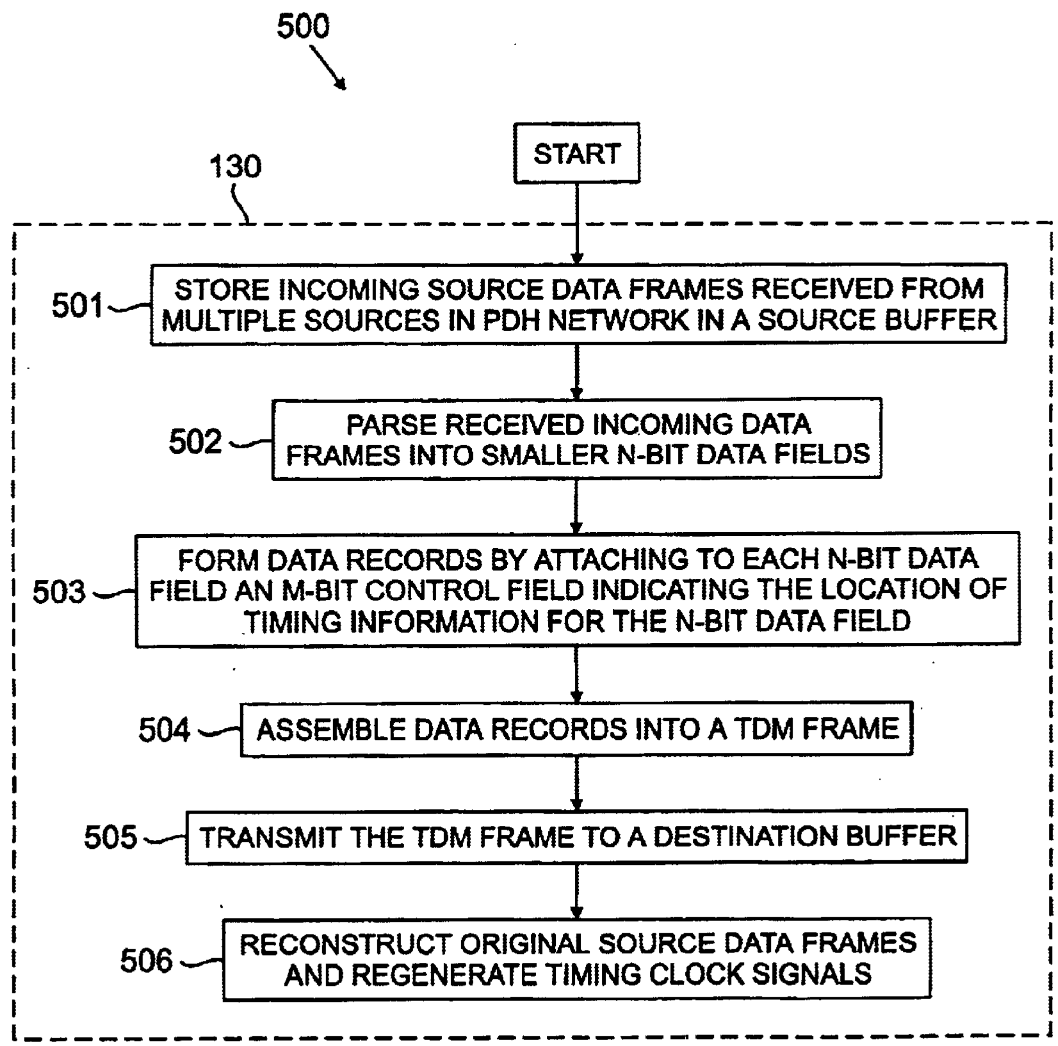
FIG. 5 is a flow diagram illustrating a data transfer operation in an exemplary signal concentrator in accordance with one embodiment of the present invention.

FIG. 5 is a flow diagram 500 illustrating an exemplary data transfer operation in exemplary signal concentrator 130 in accordance with one embodiment of the present invention. The exemplary data transfer is generalized to cover situations in which frame data is entering concentrator 130 from either ATM backbone network 101 or from external frame relay and/or ATM user devices.

Initially, incoming source data frames received from multiple sources in a plesiochronous digital hierarchy network, such as network infrastructure 100, are stored in a source buffer, such as one of TDM IN TX buffer 403, TDM IN TX buffer 413, TDM OUT TX buffer 452, or TDM OUT TX buffer 462 (process step 501). Next, the stored incoming data frames are parsed (i.e., segmented, divided, etc.) into smaller N-bit data fields, such as a 32-bit data field (process step 502).

The source buffer forms data records attaching to each N-bit data field an M-bit control field, such as a 6-bit control field, wherein the M-bit control field indicates the location of timing information in the N-bit data field or indicates that the N-bit data field contains SRTS information (process step 503). The source buffer then assembles a group of data records into a TDM frame (process step 504). The source buffer transmits the TDM frame to a destination buffer, such as one of TDM IN RX buffer 463, TDM OUT RX buffer 412, TDM IN RX buffer 453, or TDM OUT RX buffer 402 (process step 505). The destination buffer reconstructs the original source data frames from the data fields in the TDM frame using the control fields associated with each data field and regenerates the clock signals/frame pulses/frame markers associated with each source data frame.

Although the present invention has been described in detail, those skilled in the art should understand that they can make various changes, substitutions and alterations herein without departing from the spirit and scope of the invention in its broadest form.

What is claimed is:

1. For use in a communications device, a data transfer system comprising:

a frame data interface circuit capable of receiving incoming data frames from a plurality of frame data sources;

a transmit buffer coupled to said frame data interface circuit and capable of receiving said incoming data frames therefrom, wherein said transmit buffer is capable of dividing a first selected incoming data frame into a plurality of N-bit data fields and attaching to each of said plurality of N-bit data fields an M-bit control field comprising a synchronization indicia associated with said first selected incoming data frame, said each N-bit data field and said attached M-bit control field comprising a data record; and a receive buffer coupled to said transmit buffer and capable of receiving said data records therefrom, wherein said receive buffer is capable of re-assembling said first selected incoming data frame from selected ones of said received data records and generating from said synchronization indicia therein a timing signal associated with said first selected incoming data frame.

2. The data transfer system set forth in claim 1 wherein said first selected incoming data frame comprises a T1 frame received from a T1 line coupled to said frame data interface circuit.

3. The data transfer system set forth in claim 2 wherein said synchronization indicia comprises a frame marker indicating a boundary of said T1 frame.

4. The data transfer system set forth in claim 3 wherein a first M-bit control field in a first selected data record indicates a location of said frame marker in a first N-bit data record in said first selected data record.

5. The data transfer system set forth in claim 1 wherein said synchronization indicia comprises a synchronous residual time stamp.

6. The data transfer system set forth in claim 1 wherein said first selected incoming data frame comprises a T3 frame received from a T3 line coupled to said frame data interface circuit.

7. The data transfer system set forth in claim 1 wherein at least one of said incoming data frames received by said frame data interface circuit is received at a first bit data rate and at least one of said incoming data frames received by said frame data interface circuit is received at a second bit data rate different than said first bit data rate.

8. The data transfer system set forth in claim 7 wherein said incoming data frames received by said frame data interface circuit comprise T1 frames and T3 frames.

9. A signal concentrator comprising:

a frame data interface capable of receiving incoming data frames from a plurality of frame data sources and transmitting outgoing data frames to said plurality of frame data sources;

an ATM data interface capable of receiving incoming ATM cells from an ATM network and transmitting outgoing ATM cells to said ATM network;

a transmit buffer coupled to said frame data interface and capable of receiving said incoming data frames therefrom, wherein said transmit buffer is capable of dividing selected incoming data frames into a plurality of N-bit data fields and generating therefrom a plurality of data records, each of said data records comprising one of said plurality of N-bit data fields and an M-bit control field comprising synchronization indicia associated with one of said selected incoming data frames, and wherein said transmit buffer generates a composite data frame comprising a plurality of said data records; and a receive buffer coupled to said transmit buffer and capable of receiving said composite data frame therefrom, wherein said receive buffer is capable of reassembling said selected incoming data frames from said plurality of data records in said composite data frame and generating from said synchronization indicia in said plurality of data records a timing signals associated with said selected incoming data frames.

10. The signal concentrator set forth in claim 9 wherein said selected incoming data frames comprise a plurality of T1 frames received from a plurality of T1 lines coupled to said frame data interface.

11. The signal concentrator set forth in claim 10 wherein said synchronization indicia comprises a frame marker indicating a boundary of one of said plurality of T1 frames.

12. The signal concentrator set forth in claim 11 wherein a first M-bit control field in a first selected data record indicates the location of a frame marker in a first N-bit data record in said first selected data record.

13. The signal concentrator set forth in claim 9 wherein said synchronization indicia comprises a synchronous residual time stamp.

14. The signal concentrator set forth in claim 9 wherein said selected incoming data frames comprise a plurality of T3 frames received from a T3 line coupled to said frame data interface.

15. The signal concentrator set forth in claim 9 wherein at least one of said incoming data frames received by said frame data interface is received at a first bit data rate and at least one of said incoming data frames received by said frame data interface is received at a second bit data rate different than said first bit data rate.

16. The signal concentrator set forth in claim 15 wherein said incoming data frames received by said frame data interface comprise T1 frames and T3 frames.

17. For use in a communications device, a method of transferring data from an input interface of the communications device to an output interface of the communications device, the method comprising the steps of:

receiving incoming data frames on the input interface from a plurality of frame data sources;

dividing the received incoming data frames into a plurality of N-bit data fields;

generating a plurality of data records, each of the data records comprising one of the plurality of N-bit data fields and an M-bit control field comprising synchronization indicia associated with a selected incoming data frame;

generating a composite data frame comprising a plurality of the data records;

transmitting the composite data frame to the output interface; and reassembling the incoming data frames from selected ones of the received data records and generating from the synchronization indicia therein a timing signal associated with at least one of the incoming data frames.

18. The method set forth in claim 17 wherein the incoming data frames comprise T1 frames received from a plurality of T1 lines coupled to the input interface.

19. The method set forth in claim 18 wherein the synchronization indicia comprises at least one T1 frame marker indicating at least one boundary of at least one T1 frame.

20. The method set forth in claim 19 wherein a first M-bit control field in a first selected data record indicates a location of the at least one T1 frame marker in a first N-bit data record in the first selected data record.

* * * * *

UNITED STATES PATENT AND TRADEMARK OFFICE

CERTIFICATE OF CORRECTION

PATENT NO. : 6,782,007 B1
DATED : August 24, 2004
INVENTOR(S) : Mark D. Redman

It is certified that error appears in the above-identified patent and that said Letters Patent is hereby corrected as shown below:

Column 6,
Line 47, delete "26.0" and replace with -- 260 --;

Column 7,
Line 38, delete "priori" and replace with -- prior --.

Signed and Sealed this

Seventh Day of March, 2006

JON W. DUDAS
*Director of the United States Patent and Trademark Office*

UNITED STATES PATENT AND TRADEMARK OFFICE

CERTIFICATE OF CORRECTION

PATENT NO. : 6,782,007 B1
APPLICATION NO. : 09/238003
DATED : August 24, 2004
INVENTOR(S) : Mark D. Redman It is certified that error appears in the above-identified patent and that said Letters Patent is hereby corrected as shown below:

Column 6,
Line 47, delete "26.0" and replace with -- 260 --;

Column 7,
Line 38, delete "priori" and replace with -- priori --.

This certificate supersedes Certificate of Correction issued March 7, 2006.

Signed and Sealed this

Sixth Day of February, 2007

JON W. DUDAS
*Director of the United States Patent and Trademark Office*